United States Patent [19]

Rausch, Jr.

[11] 4,089,843

[45] May 16, 1978

[54] PRECIPITATING POLYMERS IN POWDER FORM

[75] Inventor: Karl W. Rausch, Jr., Hamden, Conn.

[73] Assignee: The Upjohn Company, Kalamazoo, Mich.

[21] Appl. No.: 724,583

[22] Filed: Sep. 20, 1976

[51] Int. Cl.$^2$ .................... C08G 65/46; C08G 75/20; C08G 73/10; C08G 73/14

[52] U.S. Cl. .................. 260/65; 260/47 CP; 260/49; 260/63 N; 260/75 NP; 260/77.5 R; 260/78 S; 260/78 TF; 260/79.3 M

[58] Field of Search .................. 260/65, 47 CP, 78 S, 260/78 TF, 77.5 R, 63 N, 49, 79.3 M, 75 NP

[56] References Cited

U.S. PATENT DOCUMENTS

| | | | |
|---|---|---|---|
| 2,639,278 | 5/1953 | Stott et al. ........................... | 260/78 |
| 2,977,342 | 3/1961 | Twitchett et al. ................... | 260/78 |
| 3,299,011 | 1/1967 | Battista ................................. | 260/78 |
| 3,839,285 | 10/1974 | Kunzel et al. ...................... | 260/47 CZ |
| 3,965,236 | 6/1976 | Turnbull ............................. | 264/319 |
| 3,987,015 | 10/1976 | Driscoll et al. .................... | 260/78 TF |

*Primary Examiner*—Lester L. Lee
*Attorney, Agent, or Firm*—Denis A. Firth; John Kekich

[57] ABSTRACT

A process is described for the conversion of solid polymers to powders in which the particles are substantially spherical and uniform in size. The polymer is dissolved in an aprotic solvent which is at least partially miscible with water but immiscible with mineral oil, the resulting solution is emulsified in mineral oil, and a minor amount of water or a glycol is added with agitation. The powdered polymer separates and is isolated by filtration, centrifugation and the like. Alternatively, when the precipitant is a glycol having a boiling point higher than the aprotic solvent in which the polymer is initially dissolved, the powdered polymer is isolated by filtration, centrifugation and the like after first removing the aprotic solvent and glycol by distillation. The process is applicable to a wide variety of polymers (polyimide, polyamides, polyamideimides, polyurethanes) which are soluble in aprotic solvents.

10 Claims, No Drawings

PRECIPITATING POLYMERS IN POWDER FORM

BACKGROUND OF THE INVENTION

1. Field of the Invention

This invention relates to the preparation of powdered polymers and is more particularly concerned with the production of powdered polymers having particles of substantially uniform size and shape.

2. Description of the Prior Art

Numerous methods of preparing polymers in powder form, either in the isolated state or as a dispersion in a liquid medium, are described in the art. These methods include direct precipitation by treating a solution of the polymer with a solvent in which the polymer is insoluble, spray drying the polymer from a solution thereof, or simply grinding the polymer, optionally dispersed in a liquid medium. These various methods have been applied to polymers which have already been formed and isolated in the solid state and have also been adapted to be used in conjunction with the process for preparation of the polymers. Illustrative of the latter type of process are those shown in U.S. Pat. Nos. 3,420,796; 3,894,994; and 3,917,741. Illustrative of the methods employed in reducing already formed polymers to powder form are U.S. Pat. No. 3,185,660, which shows dissolving polymers such as polyolefins and polyamides in appropriate solvents by heating under pressure and flashing the hot solution into a second vessel, and U.S. Pat. No. 3,586,654, which shows heating polymers such as polyethylene above the melting point in the presence of a non-solvent liquid and a surfactant and allowing the mixture to cool. Unfortunately, none of the above methods yield powders having reproducibly uniform particle size.

U.S. Pat. No. 3,772,252 shows the preparation of polyester polymers in powder form by dissolving the polymer in a water-immiscible solvent, emulsifying the resulting solution in water, and precipitating the polymer in powder form from the emulsion by adding a solvent in which the polymer is insoluble. U.S. Pat. No. 3,847,886 shows the same process applied to the conversion of water-insoluble vinyl polymers to powder form. The processes described in these latter references are potentially attractive for commercial use in producing powders having particles of spherical shape and relatively uniform size, but they cannot be applied to polymers which do not yield emulsions in aqueous media.

It is an object of this invention to convert solid polymers to powder form wherein the particles are of substantially uniform size and shape. It is a further object of the invention to provide a process for accomplishing this result which is relatively simple and does not require the consumption of large quantities of energy or the use of complex equipment. It is yet a further object of the invention to provide a process which is of application to a relatively broad class of polymers including polymers having relatively high resistance to heat degradation.

SUMMARY OF THE INVENTION

This invention comprises a process for the conversion of a solid polymer which is soluble in polar solvents to a powder having particles which are substantially spherical and uniform in size, which process comprises:

(a) providing a solution of said polymer in a polar solvent which solvent is miscible with water but immiscible with mineral oil;

(b) emulsifying said polymer solution in mineral oil;

(c) adding to said emulsion, with agitation, a minor amount by volume of a liquid in which said polymer is insoluble; and (d) separating from said product the powdered polymer which has been deposited.

This invention also comprises the powdered polymers obtained by said process.

DETAILED DESCRIPTION OF THE INVENTION

The process of the invention can be applied to the conversion to powder form of a wide variety of polymers the only limiting factor being the requirement that the starting polymer be soluble in a polar organic solvent which solvent is at least partially miscible with water and substantially immiscible with mineral oil. Illustrative of polar organic solvents which possess the latter properties are dimethylformamide, dimethylacetamide, tetramethylene sulfone, hexamethylphosphoramide, N-methylpyrrolidone, dimethyl sulfoxide, and the like.

Thus, the polymers to which the process of the invention can be applied include, but are not limited to, those polyimides, elastomeric polyurethanes, polyamides, polyamideimides, polyether sulfones and polyaryl sulphones which are soluble, at least to the extent of about 10 percent by weight, in polar organic solvents meeting the above requirements.

The process of the invention can be applied to the treatment of polymers which have already been isolated in the solid state as well as to the solution obtained by carrying out the formation of a polymer in solution in a polar organic solvent meeting the above requirements, without isolation of the solid polymer from the reaction solution.

In carrying out the process of the invention the starting polymer, if in previously isolated solid form, is dissolved in the polar organic solvent with heating if necessary. Advantageously the concentration of polymer in said solution is within the range of about 5 to about 50 percent by weight and preferably is in the range of about 15 to about 35 percent by weight. Where the starting polymer is already present in solution in the form of the product obtained by carrying out the polymer forming reaction in the presence of an appropriate polar organic solvent, the concentration of said polymer in the reaction solution can be adjusted, if necessary, by addition of solvent or removal of solvent by distillation, so that the final concentration of polymer in said solution falls within the above limits.

In the second step of the process of the invention, the solution of said polymer is dispersed in the form of an emulsion in mineral oil. This is achieved by incorporating, into the mineral oil or into the solution of polymer in said polar organic solvent, a minor amount of an emulsifying agent and adding the polymer solution to the mineral oil while submitting the latter to violent agitation, for example, by means of a mechanical stirrer or agitator or by the use of an homogeniser or like apparatus commonly employed in the preparation of emulsions.

The emulsifying agents which are employed in the above step are generally of the non-ionic type. The precise choice of emulsifying agent employed in any given instance will depend upon the polar organic solvent employed and upon the characteristics of the solution of polymer in said solvent. The most appropriate choice of emulsifying agent in any given instance can be determined by a process of trial and error. A particular class of emulsifying agents which has been found to be especially satisfactory over a wide range of combinations of polar organic solvent, polymer, and mineral oil are the mono esters of fatty acids such as lauric acid, stearic acid and oleic acid and glycols such as diethylene glycol. Illustrative of other classes of emulsifying agents which can be employed in the formation of the emulsions of the oil-solvent type described above are copolymers derived from two types of monomer one of which is polar and the other is relatively non-polar. Examples of polar monomers are vinylpyrrolidone, vinyl alcohol, acrylamide and the like. Examples of non-polar monomers are vinyl stearate, lauryl methacrylate, long chain alpha-olefins and the like. These copolymer surfactants and their methods of preparation are more fully described in U.S. Pat. No. 3,917,741. Such surfactants are available under the tradename "Ganex" from GAF Corporation.

The amount of emulsifying agent employed in making the emulsions described above is generally within the range of about 0.1 percent to about 2.5 percent by weight based on weight of the polar organic solvent solution of the polymer.

Any of the various grades of mineral oil commonly available in commerce can be employed in making the emulsions described above. Mineral oil is a generic term for paraffinic oils derived from petroleum having a boiling point within the range of about 330° to 390° C at atmospheric pressure. The various grades of oil differ in viscosity over a range of about 23 cps. to about 68 cps. In general it is found preferable, but not essential, in any given instance, to employ a mineral oil which has a viscosity approximating that of the polar organic solvent solution of polymer which is to be emulsified. The matching of viscosity of the two components is facilitated, if necessary, by appropriate adjustment of the concentration of the polymer in the solution within the ranges previously discussed.

The proportions by volume of mineral oil to polymer solution employed in making the emulsions described above are advantageously within the range of 10:1 to 1:1 and, preferably, are within the range of 3:1 to 1:1.

The emulsion obtained in the above described step of the process of the invention comprises minute spherical beads of polymer solution dispersed in the mineral oil. In the third step of the process of the invention, the emulsion prepared as described above is treated with a minor amount by volume, based on said emulsion, of a liquid in which the polymer is insoluble. This step is advantageously carried out by subjecting the emulsion to vigorous agitation and adding the liquid precipitant thereto. The liquid precipitant is water or a glycol. The glycols which can be used for this purpose are inclusive of ethylene glycol, diethylene glycol, triethylene glycol and higher polyethylene glycols having a molecular weight up to about 225, propylene glycol, dipropylene glycol, tripropylene glycol and higher polypropylene glycols having a molecular weight up to about 300, butane-1,4-diol, pentane-1,5-diol, hexane-1,6-diol, and the like. When a glycol is employed as the liquid precipitant, it is so chosen that the boiling point of the glycol is higher than that of the polar organic solvent which has been employed in making the emulsion from which the polymer is to be precipitated.

The proportion by volume of liquid precipitant to polymer solution employed in the above process is advantageously within the range of about 0.1:1 to about 1:1 and preferably within the range of about 0.3:1 to about 0.7:1.

The addition of the liquid precipitant to the emulsion in the above stage of the process of the invention results in the separation of the polymer in the form of a powder. The latter can be isolated from the product by filtration, centrifugation, and like methods of separation of solids from liquids. Alternatively, when the liquid precipitant employed is a glycol, it is found convenient to remove the bulk of the polar organic solvent and the glycol by distillation from the final product before separation of the solid powdered polymer from the liquid. By this means it is possible to reduce considerably the volume of liquids which have to be handled in the separatory process.

The polymer powder which is isolated in the above manner can, if desired, be washed with a non-solvent liquid to remove last traces of emulsifying agent, mineral oil and the like, before being dried. It is found that the powder so obtained has particles which are substantially spherical in shape and substantially uniform in diameter. In general, the diameter of the particles is within the range of about 25 microns to about 75 microns. The ability to produce uniformly sized and shaped particles in a reproducible manner as described above is a valuable finding. Such characteristics of the powders obtained in accordance with the invention make said powders particularly well suited for use in compression molding, sinter molding and like techniques of preparing finished products from said polymers.

As set forth above, the process of the invention can be applied to the conversion of a wide variety of polymers to powdered form. It is particularly valuable in producing powdered polyimides which are to be employed in sinter molding of high temperature resistant articles. A variety of polyimides which possess the requisite solubility in polar solvents such as dimethylformamide are known in the art. Typical of such polyimides are those described in U.S. Pat. Nos. 3,708,458 and 3,787,367.

The following examples describe the manner and process of making and using the invention and set forth the best mode contemplated by the inventor of carrying out the invention but are not to be construed as limiting.

EXAMPLE 1

The polyimide employed in the following example was a copolyimide prepared by reacting 3,3',4,4'-benzophenonetetracarboxylic acid dianhydride with a stoichiometric amount of a mixture containing 80 molar percent of toluene diisocyanate (80 percent 2,4-isomer/60 percent, 2,6-isomer) and 20 molar percent of 4,4'-methylenebis(phenyl isocyanate) using the procedure set forth in Example 4 of U.S. Pat. No. 3,708,458.

A solution was prepared from 5 g. of Nopalcol 1-O (a nonionic surfactant; diethyleneglycol mono-oleate: Diamond Shamrock) and 180 g. of mineral oil (Saybolt viscosity: 335/350). The solution was subjected to high shear agitation while a total of 150 g. of a 15% w/w solution of the above polyimide in dimethylformamide was added. After the admixture was complete, the resulting emulsion was subjected to the same agitation for a further 5 minutes before adding quickly thereto, with agitation, 100 g. of water. The resulting mixture was stirred rapidly for 20 minutes and then centrifuged to isolate the solid polyimide powder. The latter was washed with benzene and then dried in air to remove benzene. The powder so obtained was slurried with water at about 60° C to leach out residual dimethylformamide and was then finally dried at 200° to 210° C for 16 hours. The resulting powder was found to have substantially spherical particles of substantially uniform diameter in the range of 40 microns to 75 microns.

EXAMPLE 2

The polyurethane elastomer employed in the following example was a thermoplastic polyurethane having a hardness of 80 Shore A and prepared from 4,4'-methylenebis(phenyl isocyanate), polycaprolactonediol and 1,4-butanediol.

A solution was prepared from 5 g. of Ganex V-216 (a lipophilic copolymer of vinylpyrrolidone and a long chain α-olefin:emulsifier: GAF Corporation) and 500 ml. of mineral oil (125/135 sec). The solution was subjected to high shear agitation while a total of 250 g. of a 25 percent w/w solution of the above polyurethane in dimethylformamide was added. The resulting emulsion was subjected to continued agitation for a few minutes and then 150 g. of water was quickly added. After the addition was complete, the mixture was agitated for a further 15 minutes before isolating the solid powdered polyurethane by centrifugal filtration using a cloth filter. The solid was washed with benzene on the filter and then suspended in water at 60° – 70° C for a short period to leach out residual dimethylformamide. The final solid was dried by heating at 150° C for 16 hr. The powdered polyurethane so obtained was found to have substantially spherical particles of substantially uniform size all of which passed through a standard 200 mesh screen.

EXAMPLE 3

A mixture of 200 g. of mineral oil (335/350 Saybolt), 4 g. of Nopalcol 1-0 (see Example 1) and 0.5 g. of Ganex V-216 (see Example 2) was subjected to vigorous mechanical agitation while a total of 125 g. of a 17.5 percent w/w solution in dimethylformamide of the polyimide employed in Example 1, was added. The resulting emulsion was subjected to continuing agitation while a total of 50 g. of ethylene glycol was added. The resulting mixture of solid, powdered polyimide and solvents was distilled under reduced pressure (50 – 75 mm. of mercury) on a waterbath to remove dimethylformamide. After the dimethylformamide had been distilled, the pressure was reduced to 0.25 to 0.5 mm. of mercury and the temperature of the distillation kettle was increased by using an oil bath at 140° C. The ethylene glycol distilled out under these conditions. After recovery of the bulk of the ethylene glycol, the undistilled residue was cooled and powdered polyimide was recovered therefrom by centrifuging. The solid powder was washed on the centrifuge with toluene and then with butyl cellosolve to remove residual mineral oil and emulsifier. The washed solid was dried at 195° C for 16 hours and was then found to be a powder in which the particles were substantially spherical and substantially uniform in diameter.

I claim:

1. A process for the conversion of a solid polymer which is soluble in dipolar solvents to a powder having particles which are substantially spherical and uniform in size which process comprises:
   (a) providing a solution containing from about 5 to about 50 percent by weight of said polymer in a polar solvent which is miscible with water but immiscible with mineral oil;
   (b) emulsifying said polymer solution in from 1 to 10 times its own volume of mineral oil;
   (c) adding to said emulsion, with agitation, from 0.1 parts by volume to equal parts by volume of a liquid in which said polymer is insoluble; and
   (d) separating from said product the powdered polymer which has been deposited.

2. The process of claim 1 wherein the liquid employed in step (c) as precipitant is water.

3. The process of claim 2 wherein the powdered polymer is isolated from the final product by centrifugation.

4. The process of claim 1 wherein the liquid employed as precipitant in step (c) is an organic liquid having a boiling point higher than the boiling point of the polar solvent employed in step (a) and wherein the separation step (d) is accomplished by first removing said dipolar solvent and said organic liquid by distillation and then separating the powdered polymer from the residual mineral oil by centrifugation.

5. The process of claim 1 wherein the solid polymer converted to powdered form is a copolyimide characterized by the recurring unit

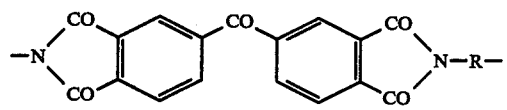

wherein from 10 to 30 percent of said recurring units are those in which R represents

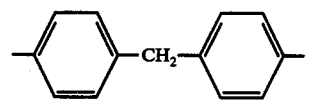

and the remainder of said units are those in which R represents a member selected from the group consisting of

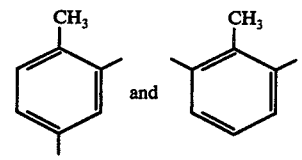

and mixtures thereof.

6. A process for the preparation of a copolyimide in powder form wherein the particles of said powder are substantially spherical and of substantially uniform diameter which process comprises emulsifying, in from 1 to 10 times its volume of a mineral oil, a solution in a polar organic solvent of from about 5 to about 50 percent by weight of a copolyimide characterized by the recurring unit

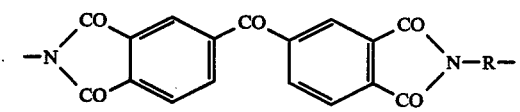

wherein from 10 to 30 percent of said recurring units are those in which R represents

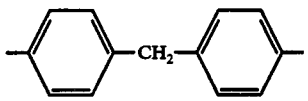

and the remainder of said units are those in which R represents a member selected from the group consisting of

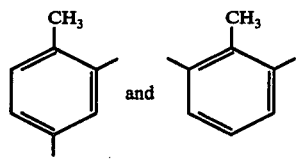

and mixtures thereof;
adding to said emulsion, with agitation, from 0.1 parts by volume to equal parts by volume of a liquid in which said polymer is insoluble; and
separating the powdered polymer which has been precipitated.

7. The process of claim 6 wherein said polar organic solvent is dimethylformamide.

8. The process of claim 6 in which said liquid in which said copolyimide is insoluble is water.

9. The process of claim 6 in which said liquid in which said copolyimide is insoluble is ethylene glycol.

10. The process of claim 9 wherein the powdered polyimide is separated from the final mixture by distilling out the polar organic solvent and ethylene glycol and separating the powdered polyimide from the residual mineral oil by centrifugation.

* * * * *